United States Patent
Kim et al.

(10) Patent No.: US 11,855,290 B2
(45) Date of Patent: Dec. 26, 2023

(54) BINDER SOLUTION FOR ALL-SOLID-STATE BATTERY INCLUDING BINDER IN FORM OF PARTICLES AND METHOD OF MANUFACTURING SAME

(71) Applicants: Hyundai Motor Company, Seoul (KR); Kia Motors Corporation, Seoul (KR); Industry-University Cooperation Foundation Hanyang University, Seoul (KR)

(72) Inventors: Sang Mo Kim, Gyeonggi-do (KR); Ju Yeon Lee, Busan (KR); Tae Young Kwon, Daegu (KR); Sung Hoo Jung, Gyeongsangnam-do (KR); Yoon Seok Jung, Seoul (KR); Kyu Tae Kim, Gyeonggi-go (KR); Dae Yang Oh, Gyeonggi-do (KR)

(73) Assignees: Hyundai Motor Company, Seoul (KR); Kia Motors Corporation, Seoul (KR); Industry-University Cooperation Foundation Hanyang University, Seoul (KR)

( * ) Notice: Subject to any disclaimer, the term of this patent is extended or adjusted under 35 U.S.C. 154(b) by 190 days.

(21) Appl. No.: 17/099,100

(22) Filed: Nov. 16, 2020

(65) Prior Publication Data
US 2021/0391580 A1    Dec. 16, 2021

(30) Foreign Application Priority Data
Jun. 16, 2020   (KR) .......................... 10-2020-0072883

(51) Int. Cl.
| | |
|---|---|
| *H01M 4/62* | (2006.01) |
| *H01M 4/505* | (2010.01) |
| *H01M 10/0562* | (2010.01) |
| *H01M 4/525* | (2010.01) |
| *H01M 10/0525* | (2010.01) |
| *H01M 4/02* | (2006.01) |

(52) U.S. Cl.
CPC .......... *H01M 4/622* (2013.01); *H01M 4/505* (2013.01); *H01M 4/525* (2013.01); *H01M 4/62* (2013.01); *H01M 4/625* (2013.01); *H01M 10/0525* (2013.01); *H01M 10/0562* (2013.01); *H01M 2004/027* (2013.01); *H01M 2004/028* (2013.01); *H01M 2300/008* (2013.01)

(58) Field of Classification Search
None
See application file for complete search history.

(56) References Cited

U.S. PATENT DOCUMENTS

| | | | |
|---|---|---|---|
| 2013/0142943 A1* | 6/2013 | Kubo .................. | H01M 4/1397 427/58 |
| 2020/0358098 A1* | 11/2020 | Kim ...................... | H01M 4/622 |

FOREIGN PATENT DOCUMENTS

| | | |
|---|---|---|
| CN | 101223206 A | 7/2008 |
| CN | 110838587 A | 2/2020 |
| JP | 2010-146823 A | 7/2010 |
| JP | 2013-033659 A | 2/2013 |
| KR | 2013-0056204 A | 5/2013 |
| KR | 10-2019-0067012 A | 6/2019 |
| KR | 102086274 B1 | 3/2020 |

OTHER PUBLICATIONS

Nam et al., Journal of Power Sources, 375, 2018, 93-101.

* cited by examiner

*Primary Examiner* — Laura Weiner
(74) *Attorney, Agent, or Firm* — Fox Rothschild LLP

(57) ABSTRACT

Disclosed are a binder solution for an all-solid-state battery including a binder in the form of particles, and a method of manufacturing the same. The binder solution may include a rubber-based binder, a first solvent for dissolving the rubber-based binder, and a second solvent in which the rubber-based binder is insoluble and which is miscible with the first solvent.

15 Claims, 8 Drawing Sheets

BINDER SOLUTION FOR ALL-SOLID-STATE BATTERY INCLUDING BINDER IN FORM OF PARTICLES AND METHOD OF MANUFACTURING SAME

CROSS REFERENCE TO RELATED APPLICATION

The present application claims priority based on Korean Patent Application No. 10-2020-0072883, filed on Jun. 16, 2020, the entire content of which is incorporated herein for all purposes by this reference.

TECHNICAL FIELD

The present invention relates to a binder solution for an all-solid-state battery including a binder in the form of particles, and to a method of manufacturing the same.

BACKGROUND

An electrode for an all-solid-state battery includes an electrode active material and a solid electrolyte. The electrode may be manufactured using a dry process or a wet process.

The dry process is a method of forming an electrode by pressing raw materials such as an electrode active material and a solid electrolyte existing in a powder form. The dry process has a merit in that the manufacture of the electrode is simple, but has a limitation in that it is difficult to increase the size thereof because the dry process is a method in which the raw materials existing in a powder form are pressed to manufacture the electrode.

The wet process is a method of forming an electrode by applying and drying an electrode slurry containing raw materials such as an electrode active material and a solid electrolyte. The wet process may be more suitable for manufacturing a large-sized electrode than the dry process.

However, a binder must be added to the electrode slurry in order to manufacture the electrode using the wet process. The binder serves to adhere the raw materials such as the electrode active material and the solid electrolyte to thus maintain a shape. However, the binder may cover the surfaces of particles such as the electrode active material and the solid electrolyte, thus preventing the movement of lithium ions in the electrode. Accordingly, the binder may cause a deterioration in the capacity, life, and output characteristics of a battery.

SUMMARY

In preferred aspects, provided area binder that provides the binding force between the constituent materials of an electrode in the form of particles and an all-solid state battery. Preferably, the exposed areas of an electrode active material and a solid electrolyte may be maximized by using the binder, thus forming the delivery path of lithium ions in the electrode without obstruction.

In one preferred aspect, provided is an all-solid-state battery including a large-area electrode.

The objectives of the present invention are not limited to the foregoing, and will be able to be clearly understood through the following description and to be realized by the means described in the claims and combinations thereof.

In an aspect, provided is a binder solution for an all-solid-state battery. The binder solution may include a rubber-based binder, a first solvent for dissolving the rubber-based binder, and a second solvent in which the rubber-based binder is insoluble and which is miscible with the first solvent.

The term "binder", as used herein, refers to a resin or a polymeric material that can be polymerized or cured to form a polymeric matrix. The binder may be cured (polymerized) or partially cured upon curing process such as heating, UV radiation, electron beaming, chemical polymerization using additives and the like. Preferably, the binder may contain rubber components. For example, the binder is a rubber-based binder. The term "rubber-based component" or "rubber-based binder" refers to a polymeric substance that is produced by polymerization of an unsaturated hydrocarbon (e.g., butylene or isoprene) or by the copolymerization of an unsaturated or aromatic hydrocarbons (e.g, styrene, or butadiene). In certain embodiments, the rubber-based binder may include substituted groups (e.g., nitrile or sulfonyl groups) on the hydrocarbon chains.

The rubber-based binder may suitably include one or more selected from the group consisting of nitrile butadiene rubber (NBR), hydrogenated nitrile butadiene rubber (HNBR), and styrene butadiene rubber (SBR), butadiene rubber (BR).

The rubber-based binder may be present in the form of particles.

The rubber-based binder may suitably have an average diameter of about 1,000 nm or less.

The rubber-based binder may suitably have a polydispersity index (PDI) of about 0.5 or less.

The difference ($R_a$) between Hansen solubility parameters of the first solvent and the rubber-based binder may be about 7 or less.

The difference ($R_a$) between Hansen solubility parameters of the second solvent and the rubber-based binder may be greater than about 7.

The difference ($R_a$) between Hansen solubility parameters of the first solvent and the second solvent may be about 20 or less.

The first solvent may include one or more selected from the group consisting of dibromomethane, benzyl acetate, ethyl 4-methyl benzoate, methyl 4-methyl benzoate, anisole, ethyl p-anisate, and benzyl isobutyrate.

The second solvent may include any one selected from the group consisting of heptane, butyl butyrate, pentyl butyrate, hexyl butyrate, heptyl butyrate, and a combination thereof.

The ratio ($V_1:V_2$) of the volume ($V_1$) of the first solvent to the volume ($V_2$) of the second solvent may be about 2:8 to 8:2.

The content of the rubber-based binder may be greater than 0 wt % and of about or less than about 20 wt %, and the sum total of the content of each of the first solvent and the second solvent may be about 80 wt % or greater and less than about 100 wt %, as the wt % are based on the total weight of the binder solution.

In an aspect, provided is an electrode slurry for an all-solid-state battery that may include the binder solution described herein, an electrode active material, a conductive material, and a solid electrolyte.

The electrode slurry may include the binder solution in an amount of greater than 0 wt % and of about or less than about 30 wt %, the conductive material in an amount of greater than 0 wt % and of about or less than about 10 wt %, the solid electrolyte in an amount of greater than 0 wt % and of about or less than about 20 wt %, as wt % are based on the total weight of the electrode slurry, and a remaining amount of the electrode active material.

Further provided is an electrode for an all-solid-state battery that may include a rubber-based binder obtained from the above-described binder solution, an electrode active material, a conductive material, and a solid electrolyte.

In the electrode, the ratio (B/A) of the electrochemical area (B) of the electrode active material to the total surface area (A) of the electrode active material may be about 0.2 or greater and less than about 1.

In the electrode, the ratio (B/A) may be increased as the content of a second solvent in a binder solution is increased.

In an aspect, provided is a method of manufacturing a binder solution for an all-solid-state battery that may include steps of: admixing a rubber-based binder and a first solvent to form an admixture, and adding a second solvent, in which the rubber-based binder is insoluble and which is miscible with the first solvent, to the admixture, thus precipitating the rubber-based binder in the form of particles.

According to various exemplary embodiments of the present invention, a binder may provide the binding force between the constituent materials of an electrode as being in the form of particles, so the exposed areas of an electrode active material and a solid electrolyte may be maximized, thus forming a delivery path of lithium ions in the electrode without obstruction.

In addition, an all-solid-state battery including a large-area electrode may be provided.

The effects of the present invention are not limited to the foregoing, and should be understood to include all effects that can be reasonably anticipated from the following description.

Other aspects of the invention are disclosed infra.

DETAILED DESCRIPTION

Figure 1A:
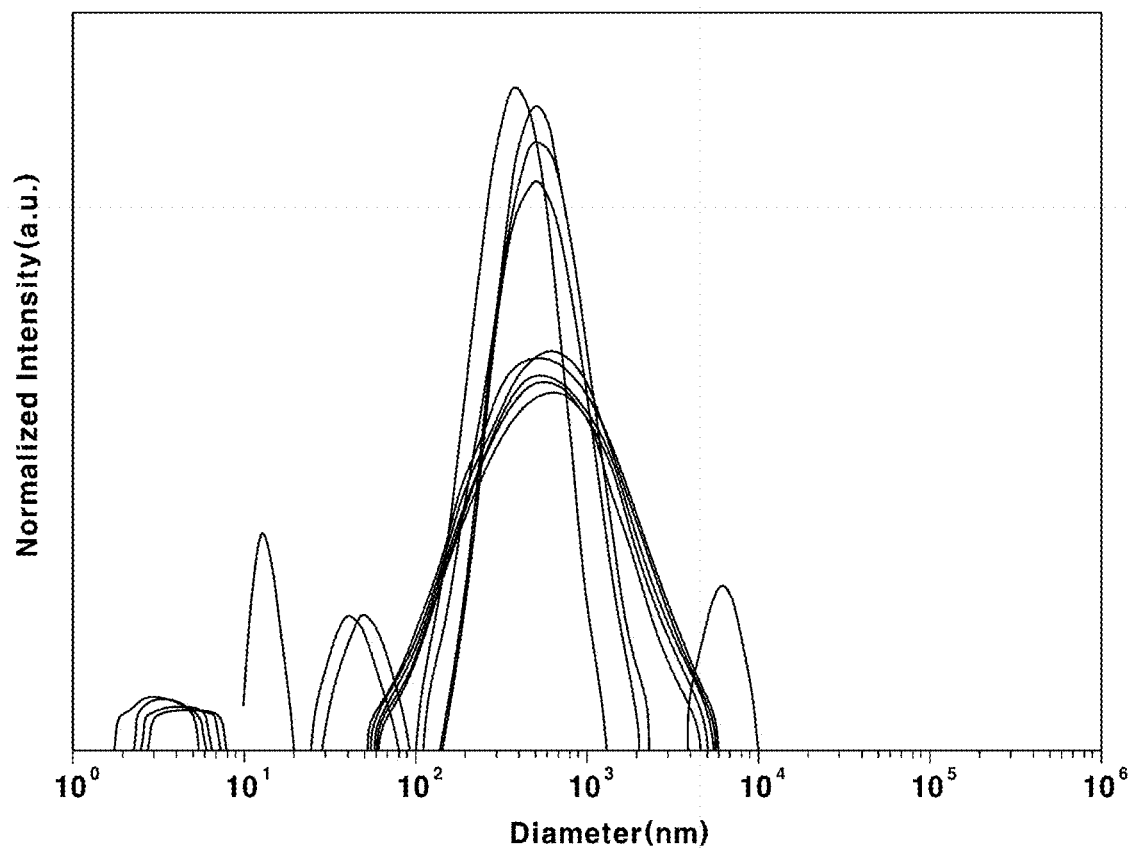
FIGS. 1A to 1C show the results of analysis of the extent of precipitation of exemplary rubber-based binders of Examples 1 to 3 according to exemplary embodiments of the present invention using dynamic light scattering (DLS)

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

In an aspect, a binder solution for an all-solid-state battery may include a rubber-based binder, a first solvent for dissolving the rubber-based binder, and a second solvent in which the rubber-based binder is insoluble.

The first solvent in which a rubber-based binder is soluble and a second solvent in which the rubber-based binder is insoluble are used together, for by mixing with the rubber-based binder simultaneously, thereby allowing the rubber-based binder to exist in the form of particles.

When an electrode slurry is manufactured using a binder solution in which the rubber-based binder is present in the form of particles, the rubber-based binder may bind constituent components while minimizing coverage of the surfaces of an electrode active material and a solid electrolyte. Accordingly, since the extent of interference of the rubber-based binder is reduced, the delivery path of lithium ions in an electrode may be formed without obstruction.

The rubber-based binder may include one or more selected from the group consisting of nitrile butadiene rubber (NBR), hydrogenated nitrile butadiene rubber (HNBR), styrene butadiene rubber (SBR), and butadiene rubber (BR).

The rubber-based binder may be present in the form of particles, and an average diameter thereof may be about 1,000 nm or less. An average diameter of the rubber-based binder of greater than about 1,000 nm may disturb the formation of an unobstructed delivery path of lithium ions in the electrode. The lower limit of the average diameter of the rubber-based binder is not particularly limited, but may be, for example, about 100 nm, about 200 nm, or about 300 nm.

The rubber-based binder may have a polydispersity index (PDI) of about 0.5 or less. When the polydispersity index of the rubber-based binder is greater than about 0.5, the rubber-based binder may be difficult to exist in the form of particles. The lower limit of the polydispersity index of the rubber-based binder is not particularly limited, but may be, for example, about 0.1, about 0.15, or about 0.18.

As described above, the first solvent for dissolving the rubber-based binder and the second solvent, in which the rubber-based binder is insoluble and which is miscible with the first solvent, may be mixed with each other and used. When the rubber-based binder is mixed with the second solvent in the state of being dissolved in the first solvent, the rubber-based binder may be in a supersaturated state and thus may aggregate, thereby precipitating in the form of particles.

Preferably, a solvent in which a Hansen solubility parameter (HSP) difference ($R_a$) with the rubber-based binder is about 7 or less may be used as the first solvent.

Further, a solvent in which a Hansen solubility parameter (HSP) difference ($R_a$) with the rubber-based binder may be greater than about 7 may be used as the second solvent.

In order to determine the solubility or miscibility between materials, similarities between materials must be compared using the intrinsic properties of materials. There are many intrinsic properties that affect solubility or miscibility, but among them, a solubility parameter that expresses the extent of binding (interaction) in a material as a quantitative value is most often used. That is, each material has a unique solubility parameter value, and materials having similar solubility parameter values dissolve or mix well with each other.

Solubility parameters have been proposed and used based on various theories or concepts, but among them, it is known that the Hansen solubility parameter (HSP) proposed by Dr. C. Hansen in 1967 can most accurately indicate solubility characteristics. The Hansen solubility parameter is subdivided into the following three parameters in consideration of the extent of binding in a material:

(1) Solubility parameter ($\delta_d$) caused by non-polar dispersion binding;

(2) Solubility parameter ($\delta_p$) caused by polar binding due to permanent dipoles; and (3) Solubility parameter ($\delta_h$) caused by hydrogen binding.

$$HSP=(\delta_d, \delta_p, \delta_h), (J/cm^3)^{1/2}$$

The Hansen solubility parameter (HSP) presented above means a vector having size and directionality in a space composed of three elements, and the basic unit representing this is $(J/cm^3)^{1/2}$. Each vector value of the Hansen solubility parameter may be calculated using a program which is called HSPiP (Hansen Solubility Parameters in Practice) developed by Dr. C. Hansen Group.

As described above, the Hansen solubility parameter (HSP) provides information on binding in a material in more detail compared to other solubility parameters, whereby it is possible to more accurately and systematically evaluate the solubility or miscibility of a material. Accordingly, the Hansen solubility parameter has been widely used.

When the vector values of the Hansen solubility parameters (HSP) of two materials are similar to each other, the materials dissolve well with each other. Since the Hansen solubility parameter (HSP) is a vector, the sizes of all three vectors of each material must be similar in order to conclude that the parameters are similar to each other. This may be represented by the difference ($R_a$) between the Hansen solubility parameters (HSP) of the two materials. As the difference ($R_a$) dl between the Hansen solubility parameters (HSP) is reduced, solubility and miscibility are improved.

$$(R_a)=4(\delta_{d2}-\delta_{d1})^2+(\delta_{p2}-\delta_{p1})^2+(\delta_{h2}-\delta_{h1})^2$$

Since the difference ($R_a$) between the Hansen solubility parameters (HSP) of the first solvent and the rubber-based binder is small, the rubber-based binder is dissolved in the first solvent. In contrast, since the difference ($R_a$) between the Hansen solubility parameters (HSP) of the second solvent and the rubber-based binder is large, the rubber-based binder is insoluble in the second solvent.

Meanwhile, in order to increase the dispersibility of the rubber-based binder in the binder solution, it may be preferable to use solvents that are miscible with each other as the first solvent and the second solvent. For example, the difference ($R_a$) between the Hansen solubility parameters (HSP) of the first solvent and the second solvent may be 20 or less.

It is preferable that the first solvent and the second solvent be stable as liquids at room temperature under normal pressure or under storage conditions. Therefore, it is preferable that the first solvent and the second solvent have boiling points at a predetermined temperature or greater. For example, the first solvent and the second solvent may have a boiling point of 150É or greater.

Further, from the economical point of view, it is preferable that the first solvent and the second solvent have a boiling point at a predetermined level or lower and a vapor pressure at a predetermined level or greater so that a large amount of thermal energy is not consumed to dry the first solvent and the second solvent. For example, the first solvent and the second solvent may have a boiling point of about 300° C. or less and a vapor pressure of about 0.001 to 10 mmHg at room temperature.

Preferably, the first solvent may suitably include one or more selected from the group consisting of dibromomethane, benzyl acetate, ethyl 4-methyl benzoate, methyl 4-methyl benzoate, anisole, ethyl p-anisate, and benzyl isobutyrate.

The second solvent may include one or more selected from the group consisting of heptane, butyl butyrate, pentyl butyrate, hexyl butyrate, and heptyl butyrate.

The Hansen solubility parameters (HSP) of the first solvent and the second solvent are shown in the following Table 1.

TABLE 1

| | | HSP | | |
|---|---|---|---|---|
| Component | | $\delta_d$ | $\delta_p$ | $\delta_h$ |
| Rubber-based binder | Nitrile butadiene rubber | 18.6 | 8.8 | 4.2 |
| First solvent | Dibromomethane | 17.8 | 6.4 | 7 |
| | Benzyl acetate | 18.3 | 5.7 | 6 |
| | Methyl 4-methyl benzoate | 19 | 6.5 | 3.8 |
| | Anisole | 17.8 | 4.1 | 6.7 |
| | Benzyl isobutyrate | 17.4 | 3.6 | 4.6 |
| Second solvent | Heptane | 15.3 | 0 | 0 |
| | Butyl butyrate | 15.6 | 2.9 | 5.6 |
| | Pentyl butyrate | 15.9 | 3.5 | 5.0 |
| | Hexyl butyrate | 16.0 | 3.2 | 4.7 |

The ratio ($V_1:V_2$) of the volume ($V_1$) of the first solvent to the volume ($V_2$) of the second solvent may be about 2:8 to 8:2. When the volume of the first solvent is small, the rubber-based binder may not be sufficiently dissolved in the first solvent. When the volume of the first solvent is large, the volume of the second solvent is relatively small, so the rubber-based binder may not be precipitated.

In the binder solution, the content of the rubber-based binder may be greater than 0 wt % and of about or less than about 20 wt %, and the sum total of the content of the first solvent and the second solvent may be 80 wt % or greater and of about or less than about 100 wt %, based on the total weight of the binder solution. When the content of the rubber-based binder is greater than 20 wt %, the rubber-based binder may not be dissolved in the first solvent.

An electrode slurry for an all-solid-state battery may include the above-described binder solution, an electrode active material, a conductive material, and a solid electrolyte.

The electrode slurry may include the binder solution in an amount of greater than 0 wt % and of about or less than about 30 wt %, the conductive material in an amount of greater than 0 wt % and of about or less than about 10 wt %, the solid electrolyte in an amount of greater than 0 wt % and of about or less than about 20 wt % or less, as wt % are based on the total weight of the electrode slurry, and a remaining amount of the electrode active material. The contents are not particularly limited, and the content of each component may be appropriately adjusted according to the purpose and effect to be achieved.

An electrode for an all-solid-state battery may include a rubber-based binder obtained from the above described binder solution, an electrode active material, a conductive material, and a solid electrolyte.

The rubber-based binder may be present in the form of particles in the binder solution. As described above, the rubber-based binder provides binding force between components while minimizing coverage of the surfaces of the electrode active material, the conductive material, and the solid electrolyte. Therefore, the exposed areas of the electrode active material and the solid electrolyte are increased, and the contact area between the two constituent components is increased. Accordingly, the delivery path of lithium ions in the electrode may be formed without obstruction.

In the electrode, the ratio (B/A) of the electrochemical area (B) of the electrode active material to the total surface area (A) of the electrode active material may be about 0.2 or greater and less than about 1.

The total surface area (A) of the electrode active material means a value obtained by multiplying the BET specific surface area of the electrode active material by the weight of the electrode active material contained in the electrode. The electrochemical area (B) of the electrode active material means the electrochemical contact area between the electrode active material and the solid electrolyte, which may be measured using a galvanostatic intermittent titration technique (GITT).

The electrochemical area obtained using the GITT may be measured from the current application time ($\tau$), the ion diffusion coefficient (D) in the electrode active material, the atomic weight ($M_B$) of the electrode active material, the mass ($m_B$) of the electrode active material, the potential difference ($\Delta E_t$) for the current application time, and the equilibrium potential difference ($\Delta E_s$) between unit current application times.

$$B = \frac{2}{\sqrt{\pi \tau D}} \left(\frac{m_B V_M}{M_B}\right)\left(\frac{\Delta E_s}{\Delta E_t}\right)$$

The electrode active material may be a cathode active material or an anode active material.

The cathode active material is not particularly limited, but may be, for example, an oxide active material or a sulfide active material.

The oxide active material may be a rock-salt-layer type active material such as $LiCoO_2$, $LiMnO_2$, $LiNiO_2$, $LiVO_2$, or $Li_{1+x}Ni_{1/3}Co_{1/3}Mn_{1/3}O_2$, a spinel-type active material such as $LiMn_2O_4$ or $Li(Ni_{0.5}Mn_{1.5})O_4$, a reverse-spinel-type active material such as $LiNiVO_4$ or $LiCoVO_4$, an olivine-type active material such as $LiFePO_4$, $LiMnPO_4$, $LiCoPO_4$, or $LiNiPO_4$, a silicon-containing active material such as $Li_2FeSiO_4$ or $Li_2MnSiO_4$, a rock-salt-layer type active material in which a part of a transition metal is replaced with a dissimilar metal, such as $LiNi_{0.8}Co_{(0.2-x)}Al_xO_2$ (0<x<0.2), a spinel-type active material in which a part of a transition metal is replaced with a dissimilar metal, such as $Li_{1+x}Mn_{2-x-y}M_yO_4$ (M being at least one type among Al, Mg, Co, Fe, Ni, and Zn, and 0<x+y<2), or lithium titanate such as $Li_4Ti_5O_{12}$.

The sulfide active material may suitably include copper chevrel, iron sulfide, cobalt sulfide, or nickel sulfide.

The anode active material is not particularly limited, but may be, for example, a carbon active material or a metal active material.

The carbon active material may suitably include mesocarbon microbeads (MCMB), graphite such as high orientation graphite (HOPG), or amorphous carbon such as hard carbon and soft carbon.

The metal active material may suitably include In, Al, Si, Sn, or an alloy containing one or more of these elements.

The conductive material is a constituent component that forms an electron conduction path in the electrode. The conductive material may be $sp^2$ carbon materials such as carbon black, conductive graphite, ethylene black, or carbon nanotubes, or graphene.

The solid electrolyte may be an oxide-based solid electrolyte or a sulfide-based solid electrolyte. However, it may be preferable to use a sulfide-based solid electrolyte having high lithium ion conductivity.

The sulfide-based solid electrolyte may suitably include $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (m and n being positive numbers, and Z being any one of Ge, Zn, and Ga), $Li_2S$—$GeS_2$, $Li_2S$—$SiS_2$—$Li_3PO_4$, $Li_2S$—$SiS_2$-$Li_xMO_y$ (x and y being positive numbers, and M being any one of P, Si, Ge, B, Al, Ga, and In), or $Li_{10}GeP_2Si_2$.

In an aspect, a method of manufacturing a binder solution for an all-solid-state battery may include dissolving a rubber-based binder in a first solvent and adding a second solvent, in which the rubber-based binder is insoluble and which is miscible with the first solvent, to a resultant product, thus precipitating the rubber-based binder in the form of particles.

The rubber-based binder, the first solvent, and the second solvent are described above, and a detailed description thereof will be omitted below.

The method of precipitating the rubber-based binder is not particularly limited. However, for example, agitation may be performed under a predetermined condition while the second solvent is added.

EXAMPLE

Hereinafter, other forms of the present invention will be described in more detail through Examples. The following Examples are only examples to help understanding of the present invention, and the scope of the present invention is not limited thereto.

Examples 1 to 7 and Comparative Examples 1 to 3

Binder solutions were manufactured so as to have the compositions described in the following Table 2.

TABLE 2

| Classification | Rubber-based binder | First solvent | Second solvent | Volume ratio of first solvent and second solvent |
|---|---|---|---|---|
| Example 1 | Nitrile butadiene rubber | Dibromomethane | Butyl butyrate | 8:2 |
| Example 2 | | Dibromomethane | Butyl butyrate | 5:5 |
| Example 3 | | Dibromomethane | Butyl butyrate | 2:8 |
| Example 4 | | Benzyl acetate | Butyl butyrate | 5:5 |
| Example 5 | | Benzyl acetate | Butyl butyrate | 2.5:7.5 |
| Example 6 | | Ethyl 4-methylbenzoate | Butyl butyrate | 5:5 |
| Example 7 | | Ethyl 4-methylbenzoate | Butyl butyrate | 2:8 |
| Comparative Example 1 | | Dibromomethane | — | — |
| Comparative Example 2 | | Benzyl acetate | — | — |
| Comparative Example 3 | | Ethyl 4-methylbenzoate | — | — |

Figure 1B:
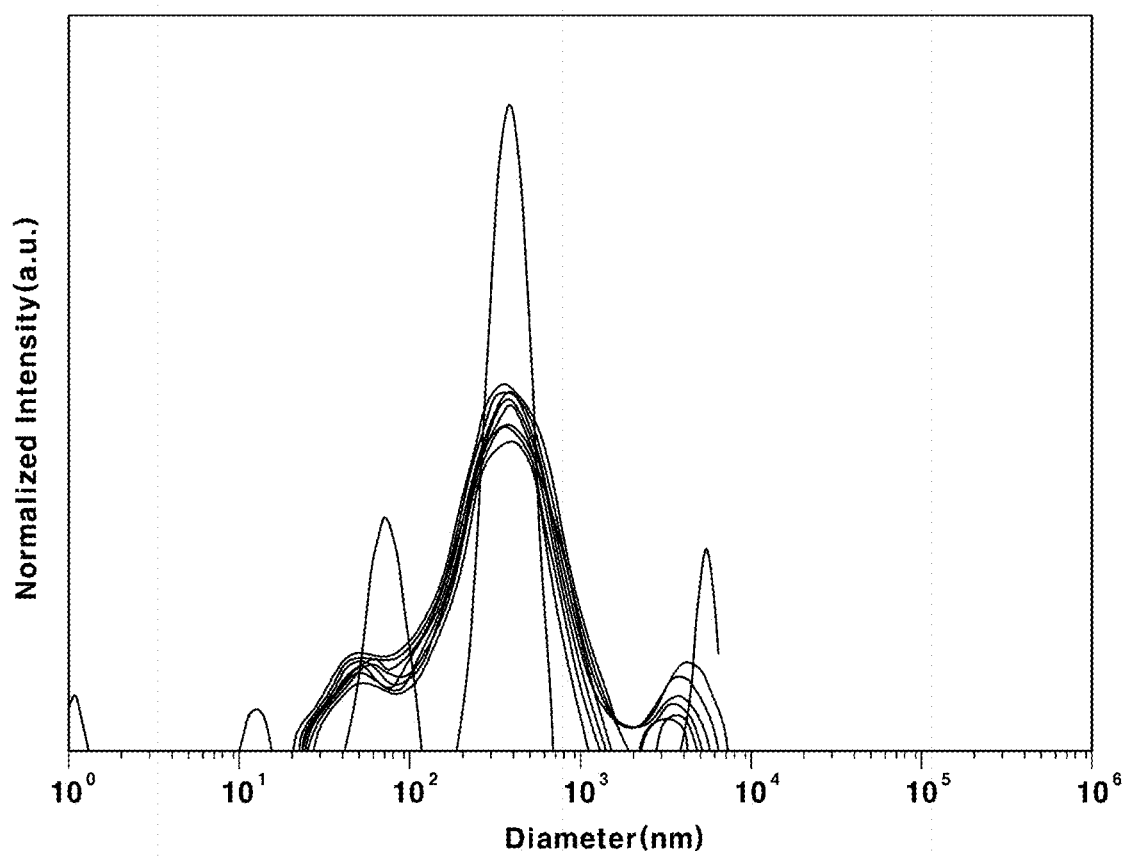
Figure 1C:
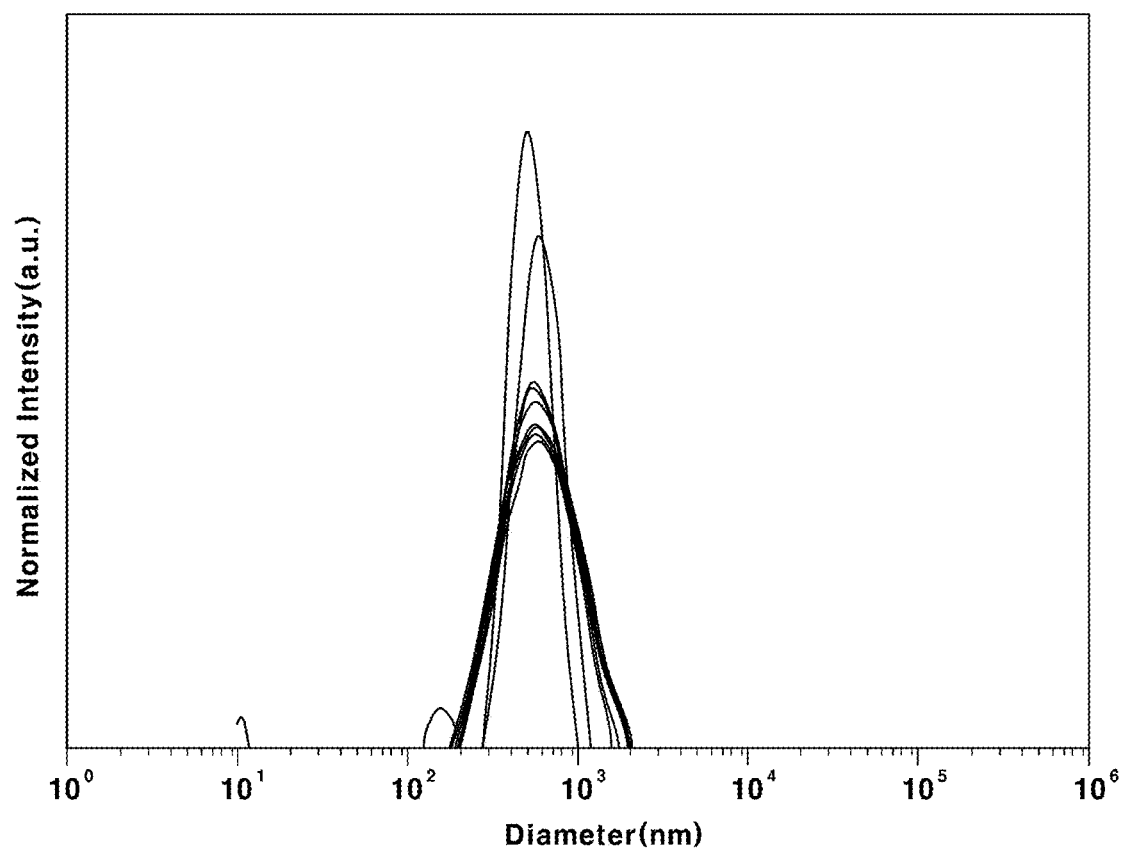

The extent of precipitation of the rubber-based binders of Examples 1 to 3 was analyzed using dynamic light scattering (DLS). The results are shown in FIGS. 1A to 1C. FIG. 1A shows the result of Example 1, FIG. 1B shows the result of Example 2, and FIG. 1C shows the result of Example 3.

As shown in FIGS. 1A to 1C, the particle size distribution of the precipitated rubber-based binder was reduced as the volume of the second solvent was increased. This means that the rubber-based binder is more uniformly precipitated as the volume of the second solvent is increased.

The average diameters ($D_{avg}$) and polydispersity indexes (PDI) of the rubber-based binders precipitated according to Examples 1 to 7 and Comparative Examples 1 to 3 are shown in the following Table 3.

The average diameters ($D_{avg}$) and polydispersity indexes (PDI) of the rubber-based binders were measured using a dynamic light scattering (DLS) method.

TABLE 3

| Classification | Average diameter [nm] | PDI [A.U.] |
|---|---|---|
| Example 1 | 429.8 | 0.297 |
| Example 2 | 354.1 | 0.216 |
| Example 3 | 515.3 | 0.186 |
| Example 4 | 632.9 | 0.434 |
| Example 5 | 442.8 | 0.190 |
| Example 6 | 501.4 | 0.384 |
| Example 7 | 526.1 | 0.288 |
| Comparative Example 1 | 1567.0 | 0.714 |
| Comparative Example 2 | 5792.4 | 0.608 |
| Comparative Example 3 | 3036.4 | 0.843 |

As shown in Table 3, the average diameters of all of the precipitated rubber-based binders of Examples 1 to 7 were 1,000 nm or less and that the polydispersity indices (PDI) thereof were 0.5 or less.

On the other hand, although the average diameters of Comparative Examples 1 to 3 were calculated, since the polydispersity index (PDI) was large, it is difficult to say that the rubber-based binder was precipitated in the form of particles.

Experimental Example 1—Manufacture of Electrode

Electrodes were manufactured using the binder solutions according to Examples 2 to 5. An electrode slurry including the binder solution, $LiNi_{0.7}Co_{0.15}Mn_{0.15}O_2$, which was an electrode active material, Super C65, which was a conductive material, and $Li_6PS_5Cl$, which was a solid electrolyte, was manufactured. The electrode slurry included 1.5 wt % of the binder solution, 70.0 wt % of the electrode active material, 1.0 wt % of the conductive material, and 27.5 wt % of the solid electrolyte.

Figure 2A:
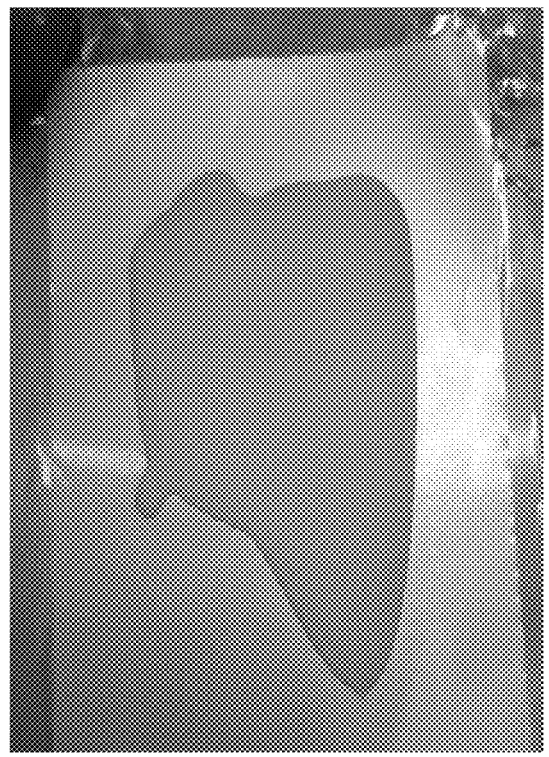
FIGS. 2A to 2D show electrodes manufactured using exemplary binder solutions of Examples 2 to 5 according to exemplary embodiments of the present invention.
Figure 2B:
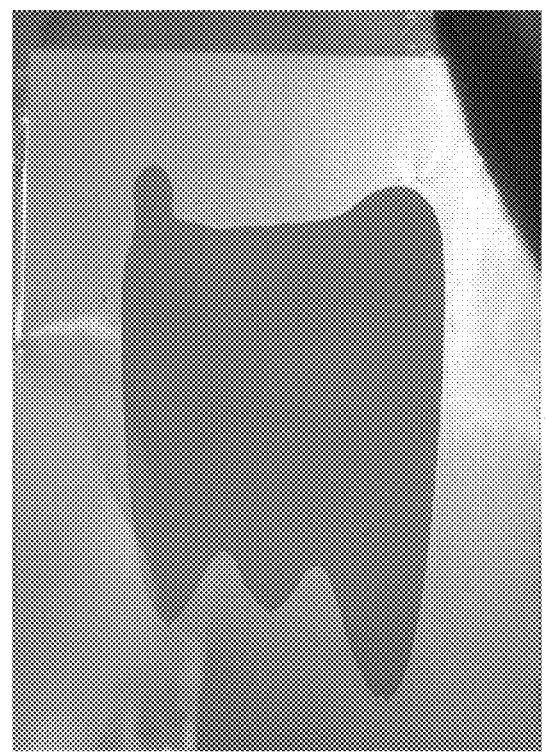
Figure 2C:
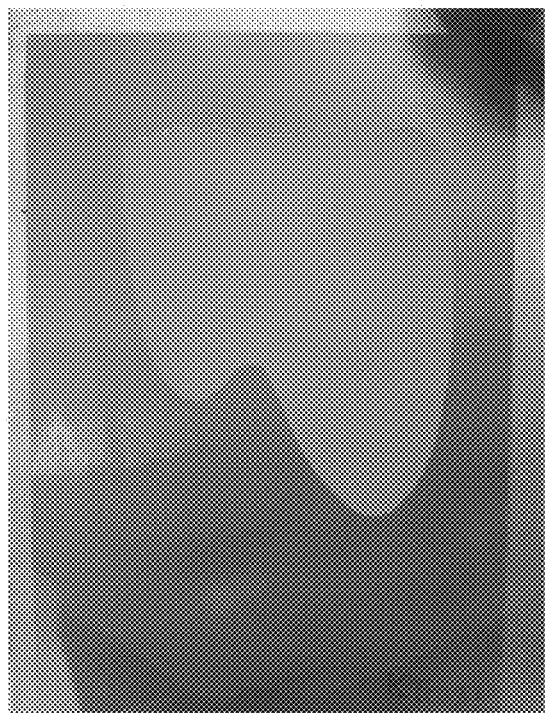
Figure 2D:
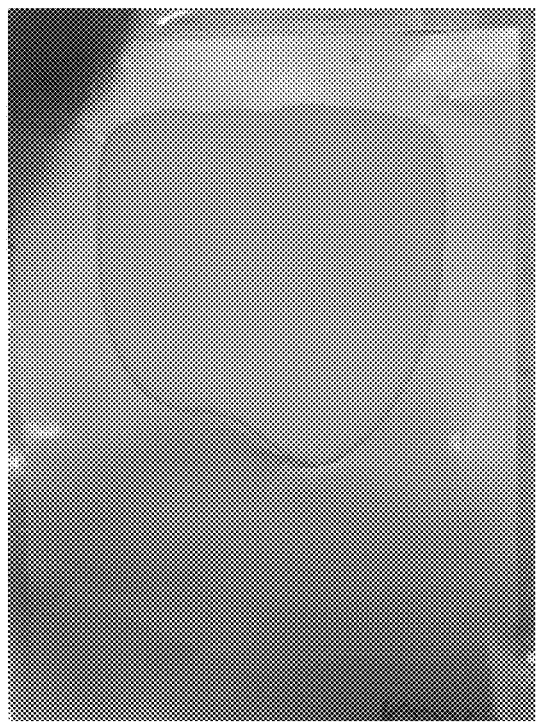

Each electrode slurry was applied on a base material to evaluate formability. The results are shown in FIGS. 2A to 2D. FIG. 2A shows the result of Example 2, FIG. 2B shows the result of Example 3, FIG. 2C shows the result of Example 4, and FIG. 2D shows the result of Example 5. As shown in FIGS. 2A to 2D, all electrodes were properly formed without cracking or breaking. Accordingly, when the binder solution according to the present invention was used, the adhesive force of the electrode to each component was sufficient, so there was no difficulty in forming the electrode.

Experimental Example 2—Ratio (B/A) of Electrochemical Area (B) of Electrode Active Material to Total Surface Area (A) of Electrode Active Material Electrodes were manufactured using the binder solutions of Examples 2 and 3. The electrochemical surface area of each electrode was calculated using a galvanostatic intermittent titration technique (GITT). The results are shown in FIG. 3 and Table 4 below.

TABLE 4

| Item | Example 2 | Example 3 |
|---|---|---|
| Weight of electrode active material [g] | 8.26 | 9.17 |
| BET specific surface area of electrode active material [cm²/g] | 3,337 | 3,337 |
| Total surface area (A) of electrode active material [cm²] | 27,563 | 30,600 |
| Electrochemical surface area (B) of electrode active material [cm²] | 3,035 | 7,602 |
| B/A | 0.1101 | 0.2484 |

Figure 3:
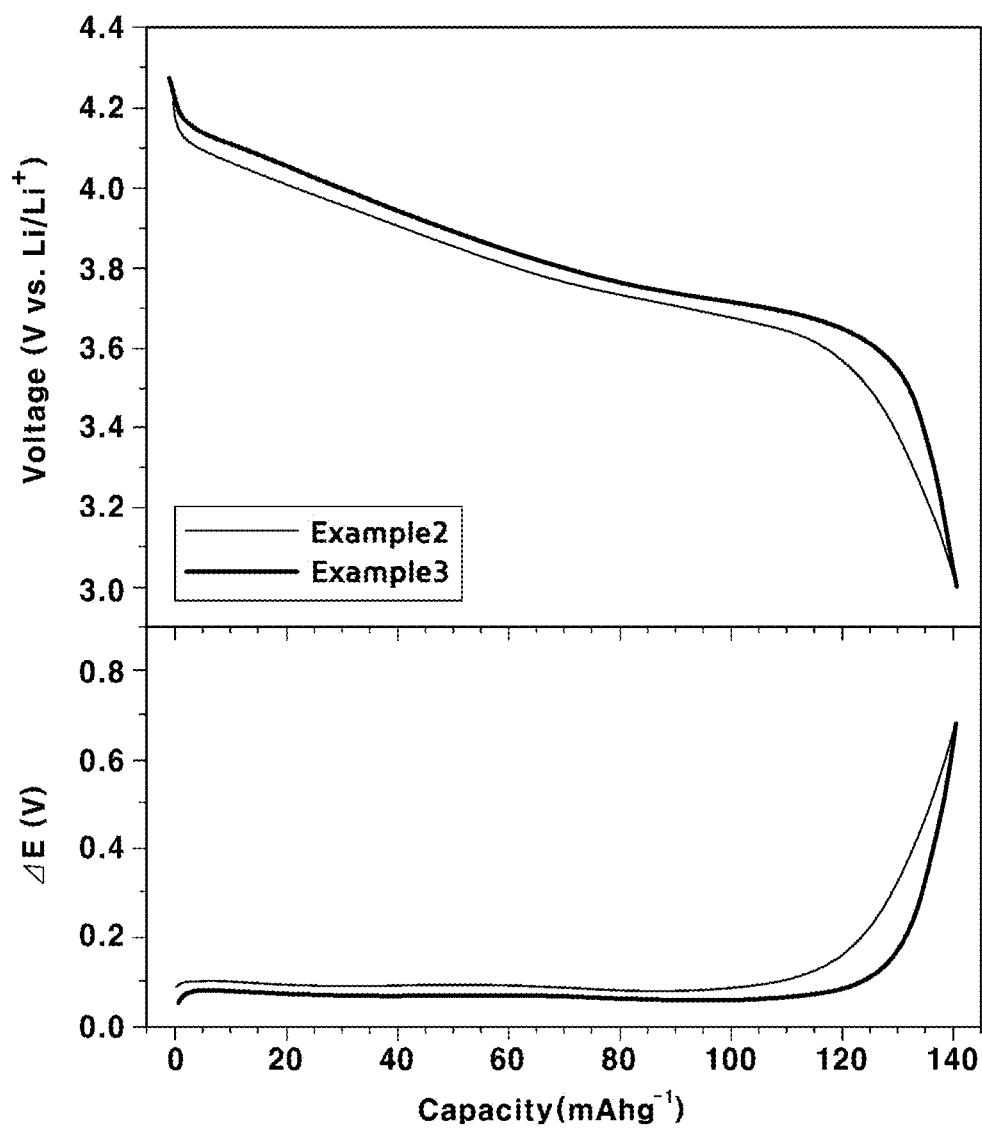
FIG. 3 shows the results of analysis of exemplary electrodes manufactured using binder solutions of Examples 2 and 3 according to exemplary embodiments of the present invention through a galvanostatic intermittent titration technique (GITT)

As shown in FIG. 3 and Table 4, since the content (volume) of the second solvent was greater in Example 3 than in Example 2, the rubber-based binder was more evenly precipitated. Accordingly, the contact area between the solid electrolyte and the electrode active material was increased, and a B/A value was high.

Experimental Example 3—Evaluation of Charge and Discharge Capacity and Rate-Determining Characteristic The charge and discharge capacity and rate-determining characteristic of the electrodes using the binder solutions according to Examples 2 and 3 and Comparative Example 1 were measured. The results are shown in FIGS. 4A and 4B.

Figure 4A:
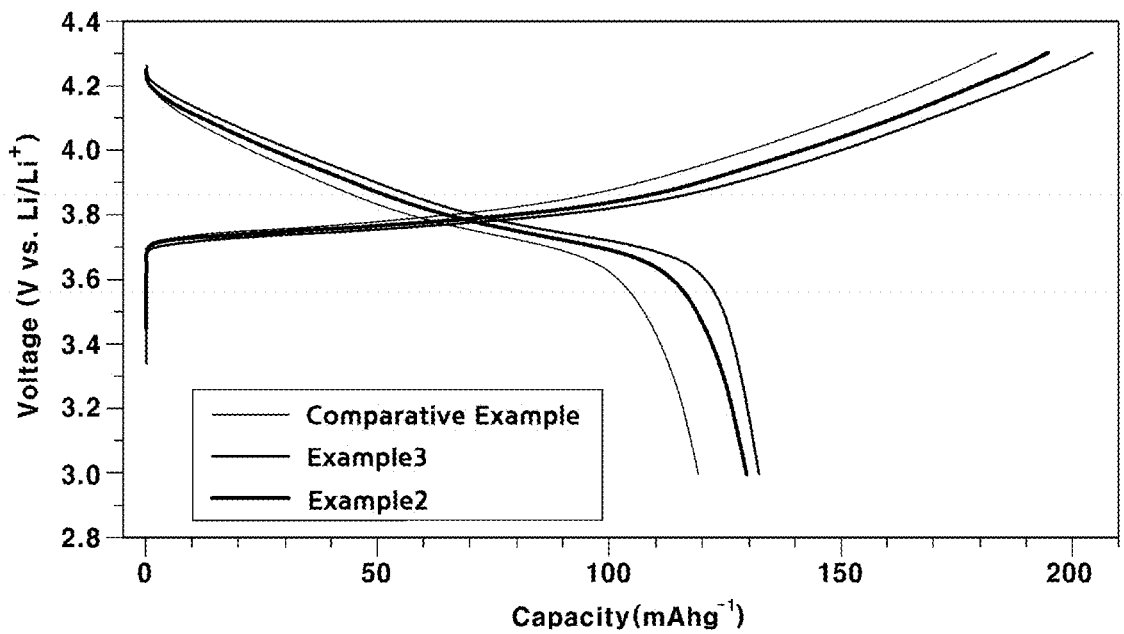
FIG. 4A shows the results of measurement of the charge and discharge capacities of electrodes manufactured using binder solutions of Examples 2 and 3 according to exemplary embodiments of the present invention and Comparative Example 1.
Figure 4B:
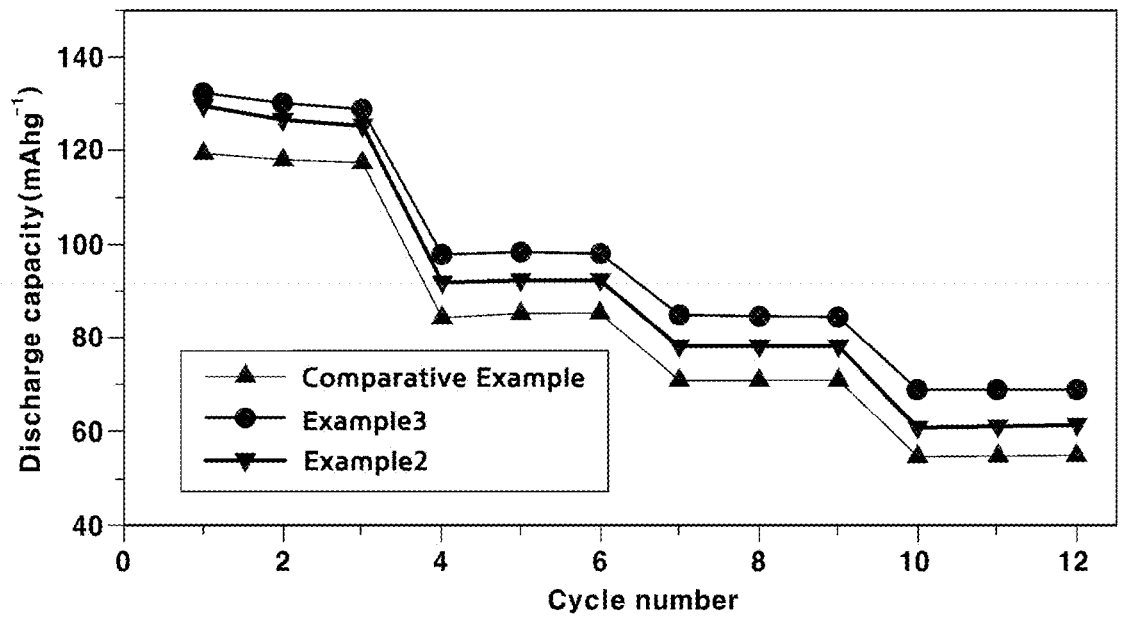
FIG. 4B shows the results of measurement of the rate-determining characteristics of electrodes manufactured using binder solutions of Examples 2 and 3 according to exemplary embodiments of the present invention and Comparative Example 1.

As shown in FIGS. 4A and 4B, the electrodes using the binder solutions according to Examples 2 and 3 had a large charge and discharge capacity, reduced overvoltage, and an improved rate-determining characteristic compared to the case of Comparative Example 1.

The charge and discharge capacity and rate-determining characteristic of the electrodes using the binder solutions according to Examples 4 and 5 were measured. The results are shown in FIGS. 5A and 5B.

Figure 5A:
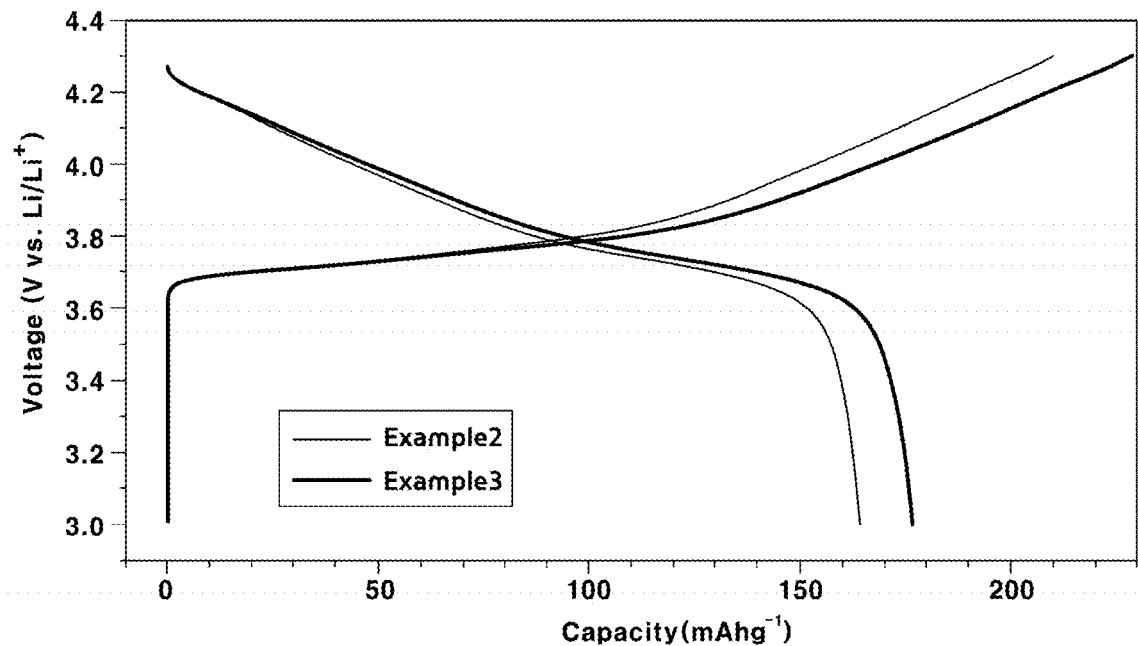
FIG. 5A shows the results of measurement of the charge and discharge capacities of exemplary electrodes manufactured using exemplary binder solutions of Examples 4 and 5 according to exemplary embodiments of the present invention.
Figure 5B:
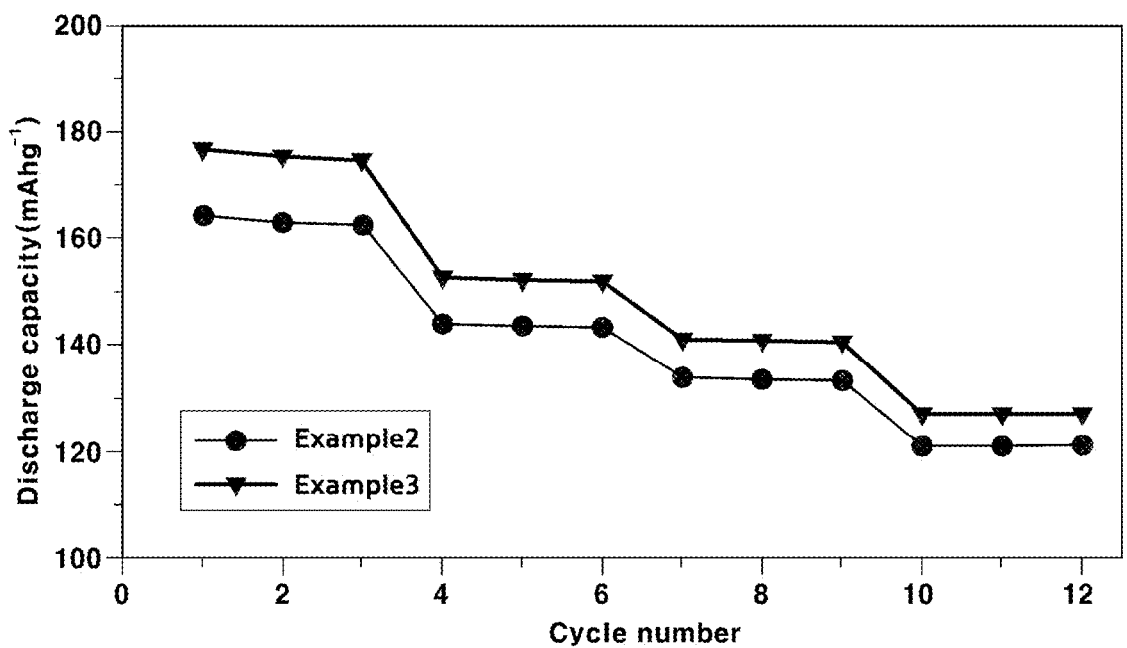
FIG. 5B shows the results of measurement of the rate-determining characteristics of exemplary electrodes manufactured using exemplary binder solutions of Examples 4 and 5 according to exemplary embodiments of the present invention.

As shown in FIGS. 5A and 5B, the electrodes using the binder solutions according to Examples 4 and 5 had a large charge and discharge capacity of 150 mAh/g and an excellent rate-determining characteristic.

As described hereinbefore, the present invention has been described in detail with respect to test examples and embodiments. However, the scope of the present invention is not limited to the aforementioned test examples and examples, and various modifications and improved modes of the present invention using the basic concept of the present invention defined in the accompanying claims are also incorporated in the scope of the present invention.

What is claimed is:

1. A binder solution for an all-solid-state battery, comprising:
    a rubber-based binder material;
    a first solvent for dissolving the rubber-based binder material; and
    a second solvent in which the rubber-based binder is insoluble and which is miscible with the first solvent,
    wherein the rubber-based binder material is in a supersaturated state and aggregates, thereby precipitating in the form of particles,
    the first solvent comprises one or more selected from the group consisting of benzyl acetate, ethyl 4-methyl benzoate, methyl 4-methyl benzoate, ethyl p-anisate, benzyl isobutyrate, and a combination thereof,
    the second solvent comprises one or more selected from the group consisting of heptane, butyl butyrate, pentyl butyrate, hexyl butyrate, heptyl butyrate, and a combination thereof.

2. The binder solution of claim 1, wherein the rubber-based binder material comprises one or more selected from the group consisting of nitrile butadiene rubber (NBR), hydrogenated nitrile butadiene rubber (HNBR), styrene butadiene rubber (SBR), and butadiene rubber (BR).

3. The binder solution of claim 1, wherein the rubber-based binder material has an average diameter of about 100 nm to 1,000 nm.

4. The binder solution of claim 1, wherein the rubber-based binder material has a polydispersity index (PDI) of about 0.1 to 0.5.

5. The binder solution of claim 1, wherein a difference ($R_a$) between Hansen solubility parameters of the first solvent and the rubber-based binder material is about 2.4 to 7.

6. The binder solution of claim 1, wherein a difference ($R_a$) between Hansen solubility parameters of the second solvent and the rubber-based binder material is about 7 to 11.8.

7. The binder solution of claim 1, wherein a difference ($R_a$) between Hansen solubility parameters of the first solvent and the second solvent is about 2.83 to 20.

8. The binder solution of claim 1, wherein a ratio ($V_1:V_2$) of a volume ($V_1$) of the first solvent to a volume ($V_2$) of the second solvent is about 2:8 to 8:2.

9. The binder solution of claim 1, wherein a content of the rubber-based binder material is greater than 0 wt % and of about or less than about 20 wt %, and a sum total of contents of the first solvent and the second solvent is about 80 wt % or greater and less than about 100 wt %, wherein the wt % based on the total weight of the binder solution.

10. An electrode slurry for an all-solid-state battery, comprising:
    the binder solution of claim 1;
    an electrode active material;
    a conductive material; and
    a solid electrolyte material,
    wherein the solid electrolyte material comprises $Li_2S$—$P_2S_5$, $Li_2S$—$P_2S_5$—$LiI$, $Li_2S$—$P_2S_5$—$LiCl$, $Li_2S$—$P_2S_5$—$LiBr$, $Li_2S$—$P_2S_5$—$Li_2O$, $Li_2S$—$P_2S5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (m and n being positive numbers, and Z selected from the group consisting of Ge, Zn, and Ga), $Li_2S$—$GeS_2$, $Li_2S$—$SiS_2$—$Li_3PO_4$, $Li_2S$—$SiS_2$—$Li_xMO_y$ (x and y being positive numbers, and M selected from the group consisting of P, Si, Ge, B, Al, Ga, and In), or $Li_{10}GeP_2S_{12}$.

11. The electrode slurry of claim 10, wherein the electrode slurry comprise the binder solution in an amount of greater than 0 wt % and of about or less than about 30 wt %, the conductive material in an amount of greater than 0 wt % and of about or less than about 10 wt %, the solid electrolyte material in an amount of greater than 0 wt % and of about or less than about 20 wt %, and a remaining amount of the electrode active material, wherein the wt % based on the total weight of the electrode slurry.

12. An electrode for an all-solid-state battery, comprising: the electrode slurry of claim 10.

13. The electrode of claim 12, wherein a ratio (B/A) of an electrochemical area (B) of the electrode active material to a total surface area (A) of the electrode active material is about 0.2 or greater and less than 1, and the electrochemical area (B) of the electrode active material means the electrochemical contact area between the electrode active material and the solid electrolyte material.

14. The electrode of claim 13, wherein the ratio (B/A) is increased as a content of a second solvent in a binder solution is increased.

15. A method of manufacturing the binder solution of claim 1, comprising:
admixing the rubber-based binder material in a first solvent to form forming an admixture; and
adding the second solvent, in which the rubber-based binder material is insoluble and which is miscible with the first solvent, to the admixture of the rubber-based binder material and the first solvent to precipitate the rubber-based binder material in a form of particles.

* * * * *